(12) United States Patent
Turbin et al.

(10) Patent No.: US 12,518,003 B2
(45) Date of Patent: Jan. 6, 2026

(54) ARRANGEMENT AND METHOD OF THREAT DETECTION IN A COMPUTER OR COMPUTER NETWORK

(71) Applicant: WithSecure Corporation, Helsinki (FI)

(72) Inventors: Pavel Turbin, Helsinki (FI); Broderick Aquilino, Helsinki (FI)

(73) Assignee: WithSecure Corporation, Helsinki (FI)

( * ) Notice: Subject to any disclaimer, the term of this patent is extended or adjusted under 35 U.S.C. 154(b) by 205 days.

(21) Appl. No.: 17/716,224

(22) Filed: Apr. 8, 2022

(65) Prior Publication Data
US 2022/0327207 A1 Oct. 13, 2022

(30) Foreign Application Priority Data
Apr. 8, 2021 (GB) ..................................... 2105025

(51) Int. Cl.
*G06F 21/55* (2013.01)
*G06F 21/56* (2013.01)

(52) U.S. Cl.
CPC .......... *G06F 21/554* (2013.01); *G06F 21/566* (2013.01); *G06F 21/568* (2013.01)

(58) Field of Classification Search
CPC .... G06F 21/554; G06F 21/566; G06F 21/568; G06F 9/455; G06F 21/53; G06F 21/556; G06F 21/552; G06F 21/55; G06F 21/56
See application file for complete search history.

(56) References Cited

U.S. PATENT DOCUMENTS

| | | | | |
|---|---|---|---|---|
| 6,031,992 A | * | 2/2000 | Cmelik | G06F 9/3812 712/E9.059 |
| 10,242,185 B1 | | 3/2019 | Goradia | |
| 10,846,405 B1 | | 11/2020 | Ciubotariu et al. | |
| 2005/0268338 A1 | * | 12/2005 | Made | G06F 21/562 726/24 |
| 2006/0021029 A1 | | 1/2006 | Brickell et al. | |
| 2009/0292858 A1 | * | 11/2009 | Lambeth | G06F 9/45558 711/6 |

(Continued)

OTHER PUBLICATIONS

Search Report of UK Patent Application GB2105025.7, completed Dec. 16, 2021, 1 page.

*Primary Examiner* — Jason K Gee
*Assistant Examiner* — Judy Bazna
(74) *Attorney, Agent, or Firm* — Meunier Carlin & Curfman LLC

(57) ABSTRACT

An arrangement and method of threat detection in a computer or computer network in which a virtual machine or a software emulator is initialized in response to starting a software application at a local machine. The software application is passed to and started at the virtual machine or software emulator, and changes made by the software application run on the local machine to at least one file and/or system configuration value of the local machine are determined and backed-up. Application events and/or behavior is analyzed at the virtual machine or software emulator to determine malicious behavior of the application. The local machine is notified about the malicious behavior and the virtual machine or software emulator session is ended. Based on receiving the notification, the software application at the local machine is terminated and changes are reverted based on the backed-up version of at least one file and/or system configuration value.

16 Claims, 5 Drawing Sheets

(56) References Cited

U.S. PATENT DOCUMENTS

| | | | |
|---|---|---|---|
| 2009/0319793 A1* | 12/2009 | Zic | G06F 21/445 713/172 |
| 2011/0191849 A1* | 8/2011 | Jayaraman | H04L 63/1416 715/205 |
| 2011/0219449 A1* | 9/2011 | St. Neitzel | G06F 21/53 726/23 |
| 2014/0040887 A1* | 2/2014 | Morariu | G06F 9/44505 718/1 |
| 2018/0173876 A1* | 6/2018 | Vissamsetty | G06F 21/6218 |
| 2018/0188720 A1* | 7/2018 | Bushey | G05B 13/04 |
| 2020/0404080 A1* | 12/2020 | Hershcovits | G06F 11/3051 |
| 2021/0232685 A1* | 7/2021 | Kraemer | G06F 21/554 |

\* cited by examiner

ARRANGEMENT AND METHOD OF THREAT DETECTION IN A COMPUTER OR COMPUTER NETWORK

PRIORITY

This application claims priority of GB patent application number 21050525.7 filed on Apr. 8, 2021, the contents of which is incorporated herein by reference.

TECHNICAL FIELD

The present invention relates to an arrangement and a method of threat detection in a computer or computer network.

BACKGROUND

Malware detection and scanning is a vital issue for the security of any kind of endpoints and networks. Malware detection and scanning is generally directed to identify and potentially also disinfect any kind of malware on computer and/or communication systems, such as e.g. viruses, Trojans, worms, or other kinds of security threats.

Antimalware file scanning is commonly a slow process and usually also depends on how reliable results are desired. One of highest accuracy method for recognizing clean or malicious files or applications is to run the file or application to be analyzed in a managed environment and later analyze its application activity. Such analyze "by running" is slow process and impacts usability as user has to wait until the analysis is finished. Running the sample is costly process also from the computer resource point of view and requires significant execution resources. That makes it also difficult and sometimes impossible to scale on large number of client hosts.

Therefore, it would be desirable to enable a reliable malware detection which is also efficient and fast for the user of the device.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

To achieve the objectives of the invention, virtualization, such as hardware virtualization, e.g. Hyper-V, software virtualization, or emulation can be utilized. Virtual machine or emulator can execute a virtual copy of operating system on a local machine or a server, such as a LAN server.

According to a first aspect, the invention relates to a method, e.g. a computer implemented method, of threat detection in a computer or computer network. In the in the method a virtual machine or a software emulator is started and/or initialized in response to starting a software application at a local machine. The software application is passed to the virtual machine or the software emulator. The software application is started at the virtual machine or the software emulator, and changes made by the software application run on the local machine to at least one file and/or system configuration value, e.g. registry value, of the local machine are determined and backed-up. Application events and/or behavior is analyzed at the virtual machine or the software emulator to determine malicious behavior of the application. Based on the detected malicious behavior of the software application at the virtual machine or the software emulator, the local machine is notified about the malicious behavior and the virtual machine or the software emulator session is ended. Based on receiving the notification about malicious behavior of the software application, the software application at the local machine is terminated and changes made by the application or to the at least one file or system configuration value are reverted based on the backed-up version of the at least one file and/or system configuration value.

In one embodiment of the invention an application or service is configured to control the virtual machine or the software emulator, e.g. to start the virtual machine or software emulator, pass the actual sample to analyze, initiate app tracing, follow results of the analysis at the virtual machine or the software emulator and/or to throttle network traffic for reduce potentially sensitive information from leaking.

In one embodiment of the invention the software application is run at the local machine, e.g. as a user process, and in virtual machine or software emulator at the same time and/or concurrently.

In one embodiment of the invention the virtual machine utilizes software virtualization and/or hardware virtualization, such as Hyper-V, or software emulation.

In one embodiment of the invention the virtual machine or software emulator is running on the local machine and/or a server, such as a LAN-server.

In one embodiment of the invention the evaluation of the software application utilizing the virtual machine or software emulator is carried out if an application is determined to be suspicious and/or unknown or from untrusted origin.

In one embodiment of the invention a local machine sensor is used to allow to intercept a file, a system configuration value and/or network operations called by the software application.

In one embodiment of the invention the virtual machine or software emulator receives events from the local machine software application or file execution to speed up decision making, e.g. for identifying malware and/or malicious behavior of the software application or file for example by matching collected events to known malicious events, or by heuristically recognizing typical malicious events.

In one embodiment of the invention if the behavior of the software application is not considered malicious at the virtual machine or the software emulator, the local machine is notified. In this case the virtual machine of software emulator session can be terminated. Determining and backing-up changes made to at least one file and/or system configuration value of the local machine by the software application run on the local machine can be terminated based on the notification and/or the made back-up can be deleted.

According to a second aspect, the invention relates to an arrangement for threat detection in a computer or computer network, wherein the arrangement comprises at least one computer, wherein the computer is configured to start and/or initialize a virtual machine or software emulator in response to starting a software application at a local machine, to pass the software application to the virtual machine or software emulator, and to start the software application at the virtual machine or software emulator. The arrangement is further configured to determine and back-up changes made by the software application run on the local machine to at least one file and/or system configuration value, e.g. a registry value, of the local machine and to analyze application events and/or behavior at the virtual machine or software emulator to determine malicious behavior of the application. Based on the detected malicious behavior of the software application at the virtual machine or software emulator, the arrangement is configured to notify the local machine about the malicious behavior and to end the virtual machine or software emulator session. Based on receiving the notification about malicious behavior of the software application, the arrangement is configured to terminate the software application at the local machine and revert changes made by the application to the at least one file or system configuration value based on the backed-up version of the at least one file and/or system configuration value.

In one embodiment of the invention the arrangement is configured to run the virtual machine or software emulator at the local computer.

In one embodiment of the invention the arrangement is configured to run the virtual machine or software emulator at a server, such as a LAN-server.

In one embodiment of the invention the arrangement is configured to carry out a method according to any embodiment of the invention.

According to a third aspect, the invention relates to a computer program comprising instructions which, when executed by a computer, cause the computer to carry out a method according to the invention.

According to a fourth aspect, the invention relates to a computer-readable medium comprising the computer program according to the invention.

With the solution of the invention it's possible to implement the antimalware file scanning in an efficient way and thus at the same time significantly increase accuracy of detection and boost the protection of user of the device without significant drawbacks. Hardware or software virtualization is effective from performance point of view, and it can be restricted in one embodiment from accessing external resources or external resources could be emulated. In one embodiment of the invention the resources of local environment are used to run and detect samples. This has the advantage that large number of samples can be analyzed and minimally centralized resources are used. In suggested method, user experience remains smooth as user can run analyzed application almost immediately. The detection method can also be used to detect against targeted user attacks.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DETAILED DESCRIPTION

In the solution of the invention, virtualization or emulation, such as hardware virtualization, e.g. Hyper-V, software virtualization or emulation can be utilized. Virtual machine or emulator can execute a virtual copy of operating system on local machine or a server, such as a LAN server.

In the in the solution of the invention a virtual machine or a software emulator is started and/or initialized in response to starting a software application at a local machine. The software application is passed to the virtual machine or the software emulator. The software application is started, at the virtual machine or the software emulator, and changes made by the software application run on the local machine to at least one file and/or system configuration value, e.g. registry value, of the local machine are determined and backed-up. Application events and/or behavior is analyzed at the virtual machine or the software emulator to determine malicious behavior of the application. Based on the detected malicious behavior of the software application at the virtual machine or the software emulator, the local machine is notified about the malicious behavior and the virtual machine or the software emulator session is ended. Based on receiving the notification about malicious behavior of the software application, the software application at the local machine is terminated and changes made by the application or to the at least one file or system configuration value are reverted based on the backed-up version of the at least one file and/or system configuration value.

Figure 1:
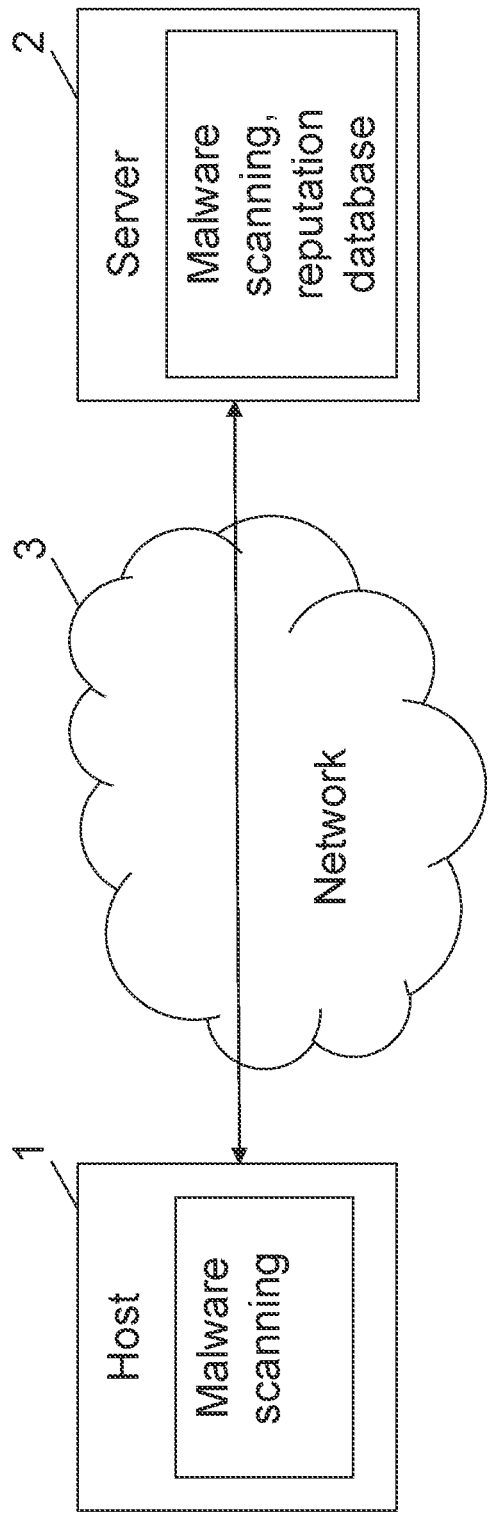
FIG. 1 presents as a schematic diagram a computer system or computer network configuration, for which exemplifying embodiments of the present invention are applicable.

FIG. 1 presents an environment in which the solution of the invention can be used. In the solution of FIG. 1 a system configuration is presented in which a local host 1 and a remote entity or server 2 are connected via a network 3. Here, the host 1 exemplifies any computer or communication system, including a single device, a network node or a combination of devices, on which malware scanning is to be performed. The scanning can be done at the host and/or at the server. For example, the host 1 may include a personal computer, a personal communication device, a network-enabled device, a client, a firewall, a mail server, a proxy server, a database server, or the like. The server 2 exemplifies any computer or communication system, including a single device, a network node or a combination of devices, on which malware scanning can be performed for the host 1, or which can provide data for the host 1 required to carry out the malware scanning at the host, such as reputation data. For example, the server 2 may include a security entity or a backend entity of a security provider, or the like, and the server 2 may be realized in a cloud implementation or the like:

According to exemplifying embodiments of the invention, malware scanning at the host 1 and/or by the server 2 can be realized using a malware analysis environment, such as a virtual machine or emulator environment, can be arranged at the host and/or at the server. E.g a malware scanning agent, such as e.g. an anti-virus software can be installed/arranged at the host 1 to be used for malware scanning.

In one embodiment of the invention the malware scanning environment, service and/or software can detect starting and closing of applications, all unusual processes and attach monitoring to the required applications and processes. Also, the services are started early, the service is able to detect and follow most of user's application. In one embodiment of the invention, when the software or service is started up, it can perform running application inventory.

The network 3 exemplifies any computer or communication network, including e.g. a (wired or wireless) local area network like LAN, WLAN, Ethernet, or the like, a (wired or wireless) wide area network like WiMAX, GSM, UMTS, LTE, or the like, and so on. Hence, the host 1 and the server 2 can but do not need to be located at different locations. For example, the network 3 may be any kind of TCP/IP-based network. Insofar, communication between the host 1 and the server 2 over the network 3 can be realized using for example any standard or proprietary protocol carried over TCP/IP, and in such protocol the malware scanning agent at the host 1 and the malware analysis sandbox or application at the server 2 can be represented on/as the application layer.

Figure 2:
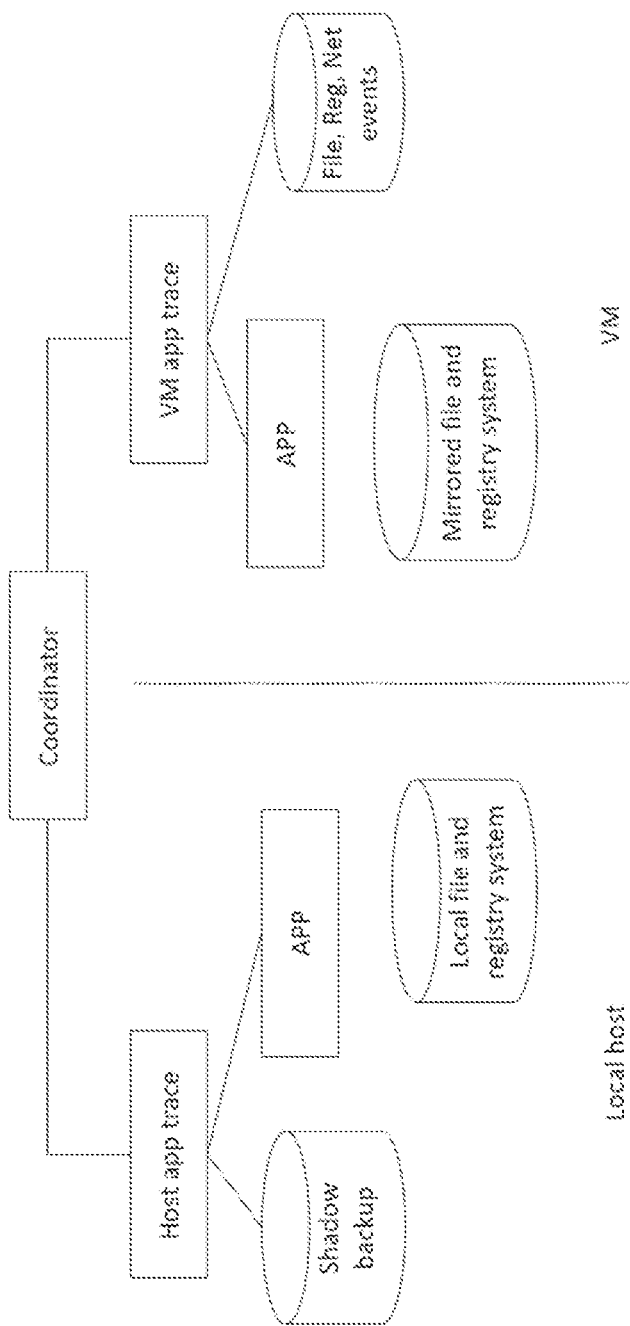
FIG. 2 presents schematically an example module composition of the solution according to one embodiment of the invention.

FIG. 2 presents one example embodiment of the invention. In the following the components or functionalities of the embodiment of FIG. 2 are presented. The solution can comprise a coordinator, e.g. a software application or a service, which coordinates the functionality of the solution. Coordinator is a component responsible to start virtual machine, pass the actual sample to analyze, initiate app tracing and/or follow the results. APP as presented in the FIG. 2 is the actual user executable application for which a deeper threat analysis is required. In one embodiment a file, a document and/or a script, can be analyzed with the solution of the invention in addition or instead of the application.

Host app trace presented in FIG. 2 is a set of operating system filters allow to intercept file, registry and network operations called by the application. Filters can be capable to record operations, recording file events, reverting logic, to take shadow copy of modified data and/or to throttle (slow down) operation of the application or the local machine.

VM app trace presented in FIG. 2 can be essentially similar to "Host app trace" tracer but it relates to the virtual machine or emulator. In one embodiment of the invention it could be alternatively implemented with snapshot diffing method. In one embodiment of the invention a shadow backup can be saved aside changed local files or registry entries by monitored application. File, Reg, Net events presented in FIG. 2 can be a collection of events made on virtual machine by the application (APP). VM app trace can periodically analyze the events to recognize malicious patterns.

Mirrored file and registry system can comprise a set of user's files, user's reg entries, environment variable and host applications visible in virtual machine or emulator, so the application (APP) running in virtual machine or emulator can be provided essentially similar execution environment as the application (APP) in host. It can also detect samples targeted crafted attacks for specific user. Actual data may still reside on host system and made visible for virtual machine of emulator running the application (APP) via file and registry filters.

Mirroring of local host file and registry systems can be implemented for example via file and registry filters running inside the virtual machine or emulator. In this case filter will emulate for virtual machine or emulator same data as the application would see on host. For example, in the case of office applications, actual user's documents could be provided to the virtual machine or the emulator.

Figure 3:
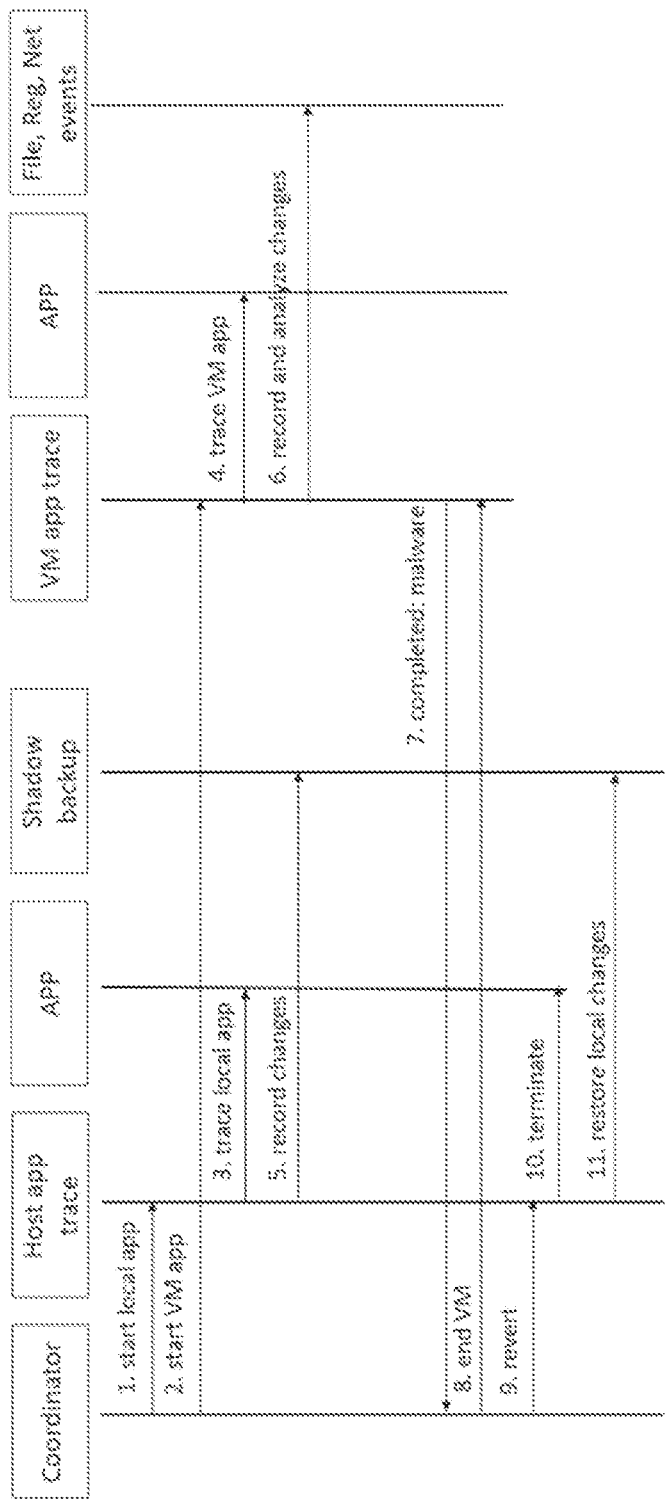
FIG. 3 presents an example embodiment of a solution of the present invention as an execution flow diagram.

FIG. 3 presents the operation of different components or functions according to one embodiment of the invention. The components can be essentially similar components as described in connection with FIG. 2. In this example the application is getting started by a user of the local machine and this can be detected by the computer. In one embodiment of the invention, the reputation of the application can be first checked, and if the application is found as suspicious from some source engine scanning and/or is from untrusted origin, the analysis of the application is carried out. When the analysis is started, coordinator requests to start tracing the local application (APP) activity. The coordinator then launches the virtual machine or emulator (VM) and passes the application to virtual machine or emulator to analyze (to detonate). Host app trace is monitoring activity of the application (APP). The virtual machine or emulator (VM) starts the application (APP) in isolated environment. Host app trace records local file and registry changes and performs shadow backup of changed data. Virtual machine or emulator app trace (VM app trace) analyzes application (APP) events to determine malicious activity. Virtual machine or emulator can also receive events from host execution to speed up decision making. If malicious activity is determined from recorded event virtual machine or emulator app trace notifies the coordinator. In this case the coordinator can end the virtual machine or the emulator session. The coordinator can notify the host app trace to remove and revert the changes the application (APP) has made. The host app trace can terminate the application (APP) and/or delete files created by the applications and/or reverts file and registry changes done by the application (APP). This example flow is only an example of how the solution of the invention can be implemented. The functionality can be implemented in the local host e.g. to the endpoint antivirus software. The coordinator does not have to be any separate element or component but in the solution of the invention its functionality can be included in the system, malware analysis environment and/or the functionality of an endpoint and/or a server.

In one example of the invention, if virtual machine or emulator app trace finds that the application is not a threat (e.g. in step 7. of FIG. 3), host app trace can be ended, e.g. by the coordinator, and shadow backup deleted. In this case the application can continue running normally.

In one example embodiment of the invention, events collected by host app trace (e.g. in in step 5. of FIG. 3) could also be used to identify malware. In case of complex malware with chained execution, scheduled tasks and/or other anti-detection techniques these events give high accuracy for detection as collected system.

In one embodiment of the invention, if host app trace hits shadow backup threshold then the process of the application can be paused, and the virtual machine or emulator can be used to analyze the application.

In one embodiment of the invention, to prevent data stealing, processes of the application can be throttled e.g. the local file reading of sensitive documents and/or outbound network transmissions are slowed. It will allow still app to perform reasonably well. If the analysis done in virtual machine or emulator finds that the application is not a threat, the above-mentioned actions, e.g. network throttling, can be ended and/or reverted to normal.

In one embodiment of the invention in which throttling is used, the throttling can allow the malware analyses to be completed and/or potential damage can be reduced if running application is found malicious. In one embodiment of the invention certain functionality, e.g. non network functionality, of analyzed app can be still kept running normally and it can reduce usability impacts of analysis. Thus, one possibility is to deny network functionality when throttling is used. In one embodiment of the invention known and trusted resources, such as IP-addresses, URLs, can be still allowed to operate at full speed during throttling.

A software emulator can be used instead of the virtual machine essentially in the similar way as described above. In case of a software emulator a software application (APP) can be disassembled and its instruction and API calls can be emulated by software. Memory, disk, network calls can be virtualized by host application. With software emulator similar result can be achieved as with a virtual machine but without running a virtual machine instance.

In one embodiment of the invention running guest instance in virtual machine or emulator can be communicated from the host by passing context of the current user. Guest instance can also be restricted from accessing actual sensitive data resources, if desired.

Figure 4:
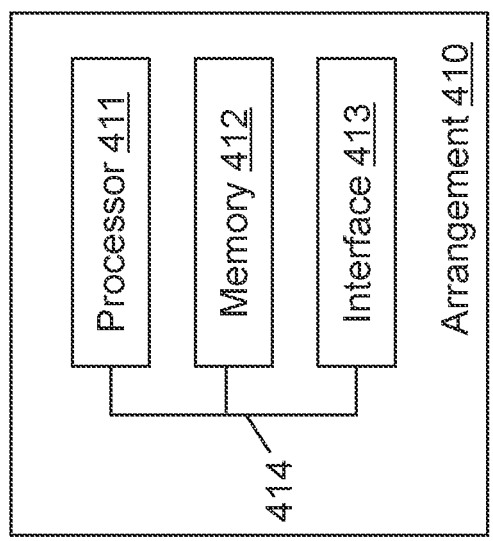
FIG. 4 presents as a schematic diagram an example of a structure of an arrangement according to exemplifying embodiments of the present invention.

As presented in FIG. 4, an arrangement 410 or at least part of the arrangement, e.g. an endpoint and/or a server, according to exemplifying embodiments of the present invention may comprise at least one processor 411 and at least one memory 412 (and possibly also at least one interface 413), which may be operationally connected or coupled, for example by a bus 414 or the like, respectively.

The processor 411 of the arrangement 410 is configured to read and execute computer program code stored in the memory 412. The processor may be represented by a CPU (Central Processing Unit), a MPU (Micro Processor Unit), etc., or a combination thereof. The memory 412 of the arrangement 410 is configured to store computer program code, such as respective programs, computer/processor-executable instructions, macros or applets, etc. or parts of them. Such computer program code, when executed by the processor 411, enables the arrangement 410 to operate in accordance with exemplifying embodiments of the present invention. The memory 412 may be represented by a RAM (Random Access Memory), a ROM (Read Only Memory), a hard disk, a secondary storage device, etc., or a combination of two or more of these. The interface 413 of the arrangement 410 is configured to interface with another arrangement and/or the user of the arrangement 410. That is, the interface 413 may represent a communication interface (including e.g. a modem, an antenna, a transmitter, a receiver, a transceiver, or the like) and/or a user interface (such as a display, touch screen, keyboard, mouse, signal light, loudspeaker, or the like).

The arrangement 410 may, for example, represent a (part of a) first node, such as local entity or host 1 in FIG. 1, or may represent a (part of a) second node, such as remote entity or server 2 in FIG. 1. The arrangement 410 may be configured to perform a procedure and/or exhibit a functionality as described in any one of FIGS. 2 to 3.

According to exemplifying embodiments of the present invention, the electronic file to be analyzed for malware can be any electronic file, particularly encompassing any electronic file including a runnable/executable part, such as any kind of application file. Insofar, exemplifying embodiments of the present invention are applicable to any such electronic file, including for example a file of an Android Application Package (APK), a Portable Executable (PE), a Microsoft Soft Installer (MSI) or any other format capable of distributing and/or installing application software or middleware on a computer.

The data collected with the solution of the invention may be stored in a database or similar model for information storage for further use.

In an embodiment, further actions may be taken to secure the computer or the computer network when a malicious file, application or activity has been detected. Also actions by changing the settings of the computers or other network nodes can be done. Changing the settings may include, for example, one or more nodes (which may be computers or other devices) being prevented from being switched off in order to preserve information in RAM, a firewall may be switched on at one or more nodes to cut off the attacker immediately, network connectivity of one or more of the network nodes may be slowed down or blocked, suspicious files may be removed or placed into quarantine, logs may be collected from network nodes, sets of command may be executed on network nodes, users of the one or more nodes may be warned that a threat or anomaly has been detected and that their workstation is under investigation, and/or a system update or software patch may be sent from the security backend to the nodes. In one embodiment of the invention one or more of these actions may be initiated automatically.

Figure 5:
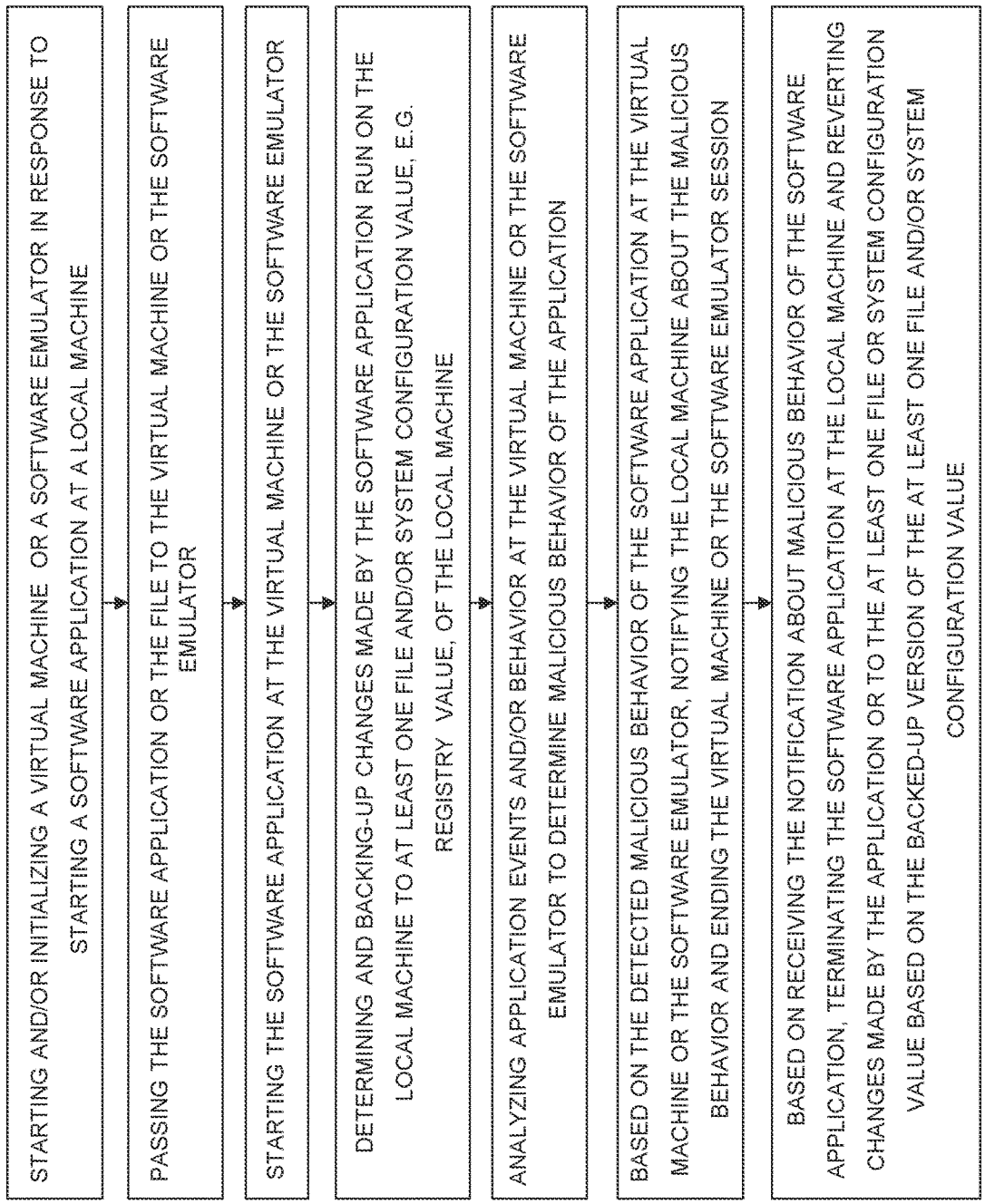
FIG. 5 presents an example method according to one embodiment of the invention.

FIG. 5 presents an example method according to one embodiment of the invention. In the in the method a virtual machine or a software emulator is started and/or initialized in response to starting a software application at a local machine. The software application is passed to the virtual machine or the software emulator. The software application is started at the virtual machine or the software emulator, and changes made by the software application run on the local machine to at least one file and/or system configuration value, e.g. registry value, of the local machine are determined and backed-up. Application events and/or behavior is analyzed at the virtual machine or the software emulator to determine malicious behavior of the application. Based on the detected malicious behavior of the software application at the virtual machine or the software emulator, the local machine is notified about the malicious behavior and the virtual machine or the software emulator session is ended. Based on receiving the notification about malicious behavior of the software application, the software application at the local machine is terminated and changes made by the application or to the at least one file or system configuration value are reverted based on the backed-up version of the at least one file and/or system configuration value.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. Lists and groups of examples provided in the description given above are not exhaustive unless otherwise explicitly stated.

The invention claimed is:

1. A method of threat detection in a computer or computer network, wherein in the method comprises:

starting and/or initializing a virtual machine or a software emulator in response to starting a software application at a local machine, and passing the software application to the virtual machine or the software emulator, determining and backing-up changes made by the software application run on the local machine to at least one file and/or system configuration value of the local machine, concurrently analyzing application events and/or behavior at the virtual machine or the software emulator to determine malicious behavior of the software application while running the software application at the local machine, in response to detecting malicious behavior of the software application at the virtual machine or the software emulator while the software application is running at the local machine, notifying the local machine about the malicious behavior and ending the virtual machine or a session of the software emulator, and in response to receiving the notification about the malicious behavior of the software application, terminating the software application at the local machine and reverting changes made by the software application or to the at least one file and/or system configuration value based on the backed-up version of the at least one file and/or system configuration value.

2. A method according to claim 1, wherein an application or service is configured to control the virtual machine or the software emulator to start the virtual machine or the software emulator, pass the actual sample to analyze, initiate app tracing, follow results of the analysis at the virtual machine or the software emulator and/or to throttle network traffic.

3. A method according to claim 1, wherein the virtual machine utilizes software virtualization and/or hardware virtualization, such as Hyper-V, or software emulation.

4. A method according to claim 1, wherein the virtual machine or the software emulator is running on the local machine and/or a server, such as a LAN-server.

5. A method according to claim 1, wherein the evaluation of the software application utilizing the virtual machine or the software emulator is carried out if application is determined to be suspicious and/or unknown or from untrusted origin.

6. A method according to claim 1, wherein a local machine sensor is used to allow to intercept a file, a system configuration value and/or network operations called by the software application.

7. A method according to claim 1, wherein the virtual machine or the software emulator receives events from the local machine software application or file execution to speed up decision making for identifying malware and/or the malicious behavior of the software application by matching collected events to known malicious events, or by heuristically recognizing typical malicious events.

8. A method according to claim 1, wherein if the behavior of the software application is not considered malicious at the virtual machine or the software emulator, the local machine is notified, the virtual machine or the session of the software emulator is terminated and/or the step of determining and backing-up changes made by the software application run on the local machine to the at least one file and/or system configuration value of the local machine is terminated and/or the back-up is deleted.

9. An arrangement for threat detection in a computer or computer network, wherein the arrangement comprises at least one computer, wherein the at least one computer is configured:

to start and/or initialize a virtual machine or a software emulator in response to starting a software application at a local machine, and to pass the software application to the virtual machine or the software emulator, to determine and back-up changes made by the software application run on the local machine to at least one file and/or system configuration value of the local machine, to concurrently analyze application events and/or behavior at the virtual machine or the software emulator to determine malicious behavior of the application while running the software application at the local machine, in response to detecting malicious behavior of the software application at the virtual machine or the software emulator, to notify the local machine about the malicious behavior and to end the virtual machine or a session of the software emulator, in response to receiving the notification about the malicious behavior of the software application, to terminate the software application at the local machine and revert changes made by the software application to the at least one file and/or system configuration value based on the backed-up version of the at least one file and/or system configuration value.

10. An arrangement according to claim 9, wherein the arrangement is configured to run the virtual machine or the software emulator at the local machine.

11. An arrangement according to claim 9, wherein the arrangement comprises a server and is configured to run the virtual machine or the software emulator at the server, such as a LAN-server.

12. An arrangement according to claim 9, wherein the arrangement is further configured to execute an application or service configured to control the virtual machine or the software emulator to start the virtual machine or the software emulator, pass the actual sample to analyze, initiate app tracing, follow results of the analysis at the virtual machine or the software emulator and/or to throttle network traffic.

13. A computer program product comprising at least one non-transitory computer-readable medium having computer-executable instructions which, when executed by a computer, cause the computer to:

start and/or initialize a virtual machine or a software emulator in response to starting a software application at a local machine, and pass the software application to the virtual machine or the software emulator;

determine and back-up changes made by the software application run on the local machine to at least one file and/or system configuration value of the local machine;

concurrently analyze application events and/or behavior at the virtual machine or the software emulator to determine malicious behavior of the software application while running the software application at the local machine;

in response to detecting malicious behavior of the software application at the virtual machine or the software emulator while the software application is running at the local machine, notify the local machine about the malicious behavior and end the virtual machine or a session of the software emulator; and in response to receiving the notification about the malicious behavior of the software application, terminate the software application at the local machine and revert changes made by the software application or to the at least one file and/or system configuration value based on the backed-up version of the at least one file and/or system configuration value.

14. A non-transitory computer-readable medium comprising a memory having instructions stored thereon which when executed by a processor cause the processor to:

start and/or initialize a virtual machine or a software emulator in response to starting a software application at a local machine, and pass the software application to the virtual machine or the software emulator;

determine and back-up changes made by the software application run on the local machine to at least one file and/or system configuration value of the local machine;

concurrently analyze application events and/or behavior at the virtual machine or the software emulator to determine malicious behavior of the software application while running the software application at the local machine;

in response to detecting malicious behavior of the software application at the virtual machine or the software emulator while the software application is running at the local machine, notify the local machine about the malicious behavior and end the virtual machine or a session of the software emulator; and in response to receiving the notification about the malicious behavior of the software application, terminate the software application at the local machine and revert changes made by the software application or to the at least one file and/or system configuration value based on the backed-up version of the at least one file and/or system configuration value.

15. An arrangement according to claim 9, wherein the at least one file and/or system configuration value of the local machine is a registry value.

16. A method according to claim 1, wherein the at least one file and/or system configuration value of the local machine is a registry value.

* * * * *